(12) United States Patent
Han et al.

(10) Patent No.: US 8,035,753 B2
(45) Date of Patent: Oct. 11, 2011

(54) APPARATUS AND A METHOD FOR TRANSMITTING AND RECEIVING A BROADCAST SIGNAL AND A DATA STRUCTURE THEREOF

(75) Inventors: Seong Cheol Han, Uijeongbu-si (KR); Seung Heon Yang, Seoul (KR); Jong Keun Youn, Gunpo-si (KR); Byoung Ho Choi, Goyang-si (KR); Jae Do Kwak, Seoul (KR); Jin Tae Kim, Gunsan-si (KR); Mun Ho Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1174 days.

(21) Appl. No.: 11/735,352

(22) Filed: Apr. 13, 2007

(65) Prior Publication Data

US 2007/0247521 A1 Oct. 25, 2007

(30) Foreign Application Priority Data

Apr. 20, 2006 (KR) .................. 10-2006-0035944

(51) Int. Cl.
*H04N 5/38* (2006.01)
*H04N 13/00* (2006.01)

(52) U.S. Cl. .......................... 348/723; 348/43

(58) Field of Classification Search ................ None
See application file for complete search history.

(56) References Cited

U.S. PATENT DOCUMENTS

| | | | | |
|---|---|---|---|---|
| 5,898,695 A | * | 4/1999 | Fujii et al. | 370/464 |
| 2004/0264931 A1 | * | 12/2004 | Nakashika et al. | 386/95 |
| 2005/0223034 A1 | | 10/2005 | Kaneko et al. | |

FOREIGN PATENT DOCUMENTS

| | | |
|---|---|---|
| EP | 1524859 A2 | 4/2005 |
| KR | 10-2005-0111379 A | 11/2005 |
| KR | 10-2005-0114278 A | 12/2005 |
| WO | WO-2004/021711 A1 | 3/2004 |
| WO | WO-2004/059980 A1 | 7/2004 |
| WO | WO-2005/057932 A1 | 6/2005 |
| WO | WO2005057932 * | 6/2005 |

* cited by examiner

*Primary Examiner* — Brian Yenke
*Assistant Examiner* — Michael Teitelbaum
(74) *Attorney, Agent, or Firm* — Birch, Stewart, Kolasch & Birch, LLP

(57) ABSTRACT

A method for transmitting a broadcast signal including generating display control information for a plurality of broadcast objects to be displayed on a receiving terminal, and transmitting the broadcasting signal including both the plurality of broadcast objects and the display control information to the receiving terminal. Further, the display control information includes instructions on how the receiving terminal is to display the plurality of images.

32 Claims, 15 Drawing Sheets

FIG. 9

| a first field (header field) | a second field (additional information field) | a third field (data field) |
|---|---|---|

FIG. 11A

| $b_7b_4$ | Description |
|---|---|
| 0 0 0 0 | complete EBU Latin based repertoire [25] |
| 0 0 0 1 | EBU Latin based common core, Cyrillic, Greek [25] |
| 0 0 1 0 | EBU Latin based core,Arabic,Hebrew,Cyrillic,Greek [25] |
| 0 0 1 1 | ISO Latin Alphabet No 2 (see ISO-8859 Part 2 [7]) |
| 0 1 0 0 | ISO Latin Alphabet No 1 (see ISO-8859 Part 1 [6]) |

FIG. 11B

| Parameter Id $b_6$ $b_0$ | Parameter | Definition | Possible occurrences | Usage mandatory for content provider | Support mandatory for MOT decoders |
|---|---|---|---|---|---|
| 00 0000 | reserved for MOT protocol extensions | | | | |
| 00 0001 | PermitOutdatedVersions | 6.2.3.1.2 | only once | no | no |
| 00 0010 00 0011 00 0100 | reserved for MOT protocol extensions | | | | |
| 00 0101 | TriggerTime (user application specific parameter) | see [5] | see [5] | see [5] | see [5] |
| 00 0110 | reserved for MOT protocol extensions | | | | |
| 00 0111 | RetransmissionDistance | 6.2.3.1.5 | only once | no | no |
| 00 1000 | reserved for MOT protocol extensions | | | | |
| 00 1001 | Expiration | 6.2.3.1.1 | only once | no | yes, if receiver provides "MOT caching support" |
| 00 1010 | Priority | 6.2.3.1.4 | only once | no | no |
| 00 1011 | Label (user application specific parameter) | see [6] | only once | no | no |
| 00 1100 | ContentName | 6.2.2.1.1 | only once | yes | yes |
| 00 1101 | UniqueBodyVersion | 6.2.3.1.3 | only once | no | no |
| 00 1110 00 1111 | reserved for MOT protocol extensions | | | | |
| 01 0000 | MimeType | 6.2.2.1.2 | only once | user application specific | user application specific |
| 01 0001 | CompressionType | 6.2.2.1.3 | only once | yes (if body is compressed) | yes; every receiver must check if an object is compressed |
| 01 0010 ... 01 1111 | reserved for MOT protocol extensions | | | | |
| 10 0000 | AdditionalHeader (user application specific parameter) | see [6] | once or several times | see [6] | see [6] |
| 10 0001 | ProfileSubset | 6.2.3.3.1 | only once | no | no |
| 10 0010 | reserved for MOT protocol extensions | | | | |
| 10 0011 | CAinfo | 6.2.3.2.1 | only once | yes (if CA is used) | yes; every receiver must check if an object is scrambled |
| 10 0100 | CAReplacementObject | 6.2.3.2.2 | only once | no | no |
| 10 0101 ... 11 1111 | reserved for user application specific parameters | | | | |

APPARATUS AND A METHOD FOR TRANSMITTING AND RECEIVING A BROADCAST SIGNAL AND A DATA STRUCTURE THEREOF

This application claims the priority benefit of Korean Application No. 10-2006-0035944, filed on Apr. 20, 2006, which is hereby incorporated by reference in its entirety.

BACKGROUND OF THE INVENTION

1. Field of the Invention

The present invention relates to an apparatus and a method for transmitting and receiving a broadcast signal and a data structure thereof.

2. Discussion of the Related Art

A digital broadcasting system can transmit not only broadcasting data originally transmitted by an analog broadcasting system, but also additional information such as text, images, etc. However, the amount of data transmitted is limited by the particular bandwidth of the digital broadcasting system. Further, the broadcasting system transmits images or data in predetermined time intervals and the images are sequentially received in the same time intervals. The images are also displayed in the same order as they are received.

In more detail, FIG. 1 is a timing diagram illustrating how images are sequentially transmitted, received and displayed according to a predetermined time interval. In FIG. 1, "n" denotes a time interval in which an image is transmitted and received. The horizontal line also corresponds to a time axis and each vertical line corresponds to a point in time in which each image is transmitted and received. As shown in FIG. 1, images A, B, C, D, E and F are sequentially transmitted every "n" time interval.

Further, as shown in the bottom of FIG. 1, the images A-F are sequentially received and displayed in the same order. However, there is a slight time delay between when the images are transmitted and displayed (see in particular the time delay of image F).

Accordingly, when images are transmitted in a narrow band, the images are displayed in the receiver very slowly, because the speed at which the broadcast objects are displayed can not be equal to a speed at which the broadcast objects are transmitted. Further, as shown in FIG. 1, the images are displayed in the same order that they were transmitted. That is, the receiver does not have any control over how the images are displayed. Rather, the way the images are displayed is strictly controlled by the transmitter.

Therefore, three-dimensional images or other types of video contents can not be normally displayed normally due to a limited bandwidth of the broadcasting system.

SUMMARY OF THE INVENTION

Accordingly, one object of the present invention is to provide an apparatus and a method for transmitting and receiving a broadcast signal and a data structure thereof that substantially obviates one or more problems due to limitations and disadvantages of the related art.

Another object of the present invention is to provide an apparatus and a method for transmitting and receiving a broadcast signal and a data structure thereof, in which the received objects are variably or dynamically displayed according to the receiver.

Another object of the present invention is to provide an apparatus and a method for transmitting and receiving a broadcast signal and a data structure thereof, in which three-dimensional images are displayed.

To achieve these objects and other advantages in accordance with the purpose of the invention, as embodied and broadly described herein, the present invention provides in one aspect a method for transmitting a broadcast signal including generating display control information for a plurality of broadcast objects to be displayed on a receiving terminal, and transmitting the broadcasting signal including both the plurality of broadcast objects and the display control information to the receiving terminal. Further, the display control information includes instructions on how the receiving terminal is to display the plurality of images. The method also provides a corresponding transmitting apparatus.

In another aspect of the present invention, the present invention provides a method for receiving a broadcast signal including receiving the broadcasting signal, extracting a plurality of broadcast objects and display control information from the received broadcast signal, and displaying the broadcast objects according to the display control information on a receiving terminal. Further, the display control information includes instructions on how the receiving terminal is to display the plurality of images on the receiving terminal. The present invention also provides a corresponding receiving apparatus.

In still another aspect, the present invention provides a data structure for transmitting images including a first field conveying header information including a size and transmission structure of raw data for the images, a second field conveying a display control information indicating displaying configuration of the images, and a third field conveying the raw data. Further, the display control information includes instructions on how the receiving terminal is to display the plurality of images.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 9 is an overview illustrating a data structure for transmitting and receiving a broadcast signal according to an embodiment of the present invention;

FIGS. 11A and 11B are overviews illustrating a part of a Multimedia Object Transfer (MOT) protocol used in a broadcasting system according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The following description uses the term "broadcast objects," which includes moving and still images, text, audio data, multimedia data, and any other type of data. However, for simplicity purposes, the broadcast objects will generally be referred to as images. Further, the order and time interval of displayed images are different from the order or interval that the images were transmitted. Therefore, the displayed images can be displayed as dynamic images or three-dimensional images.

Figure 1:
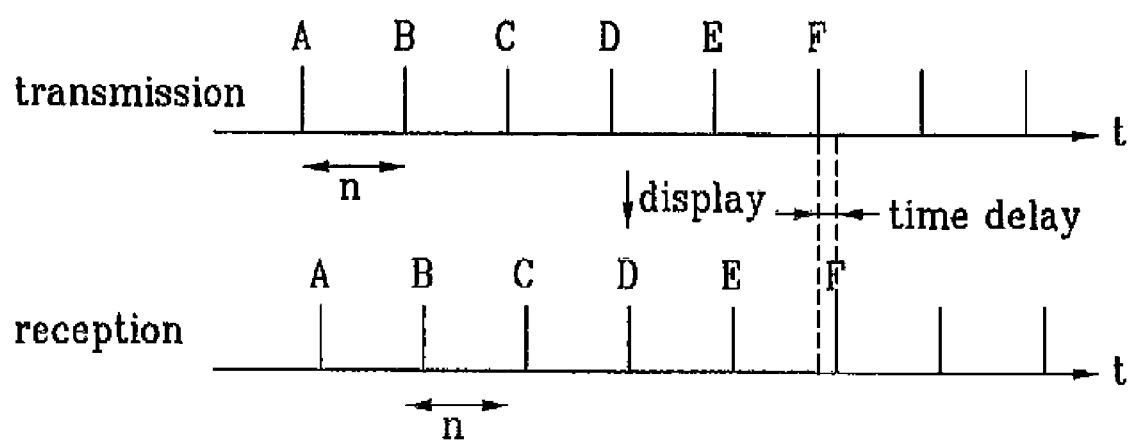
FIG. 1 is a timing diagram illustrating a related art method of transmitting and receiving a broadcast signal.
Figure 2:
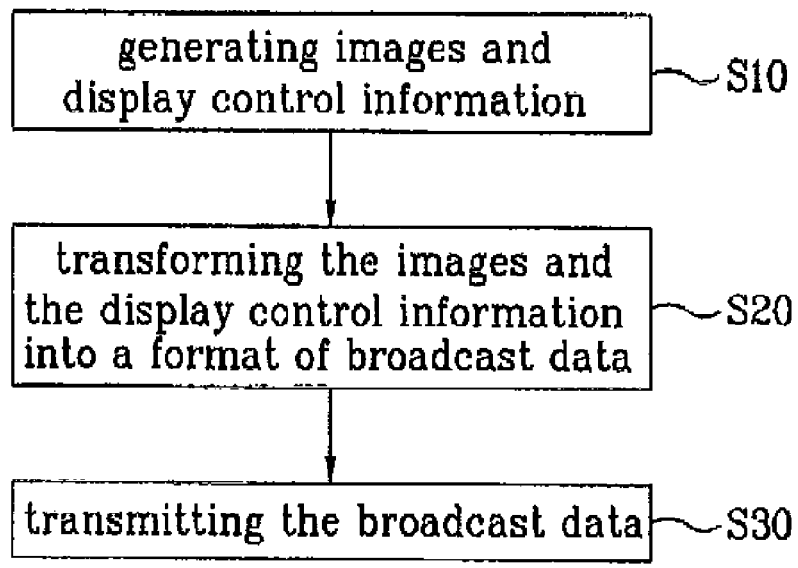
FIG. 2 is a flowchart illustrating a method for transmitting a broadcast signal according to an embodiment of the present invention.

Turning first to FIG. 2, which is a flowchart illustrating a method for transmitting a broadcast signal according to an embodiment of the present invention. As shown, the broadcast images to be transmitted are generated as well as display control information (S10). The display control information defines a rule on how the broadcast images are displayed. For example, the display control information defines a display configuration of the displayed images such as the dimension of the images, the display order of the images and so on. Next, as shown in FIG. 2, the broadcast images and the display control information are transformed into a broadcasting data format (S20). Then, the broadcasting data including the broadcast images and the display control information are transmitted (S30).

Figure 3:
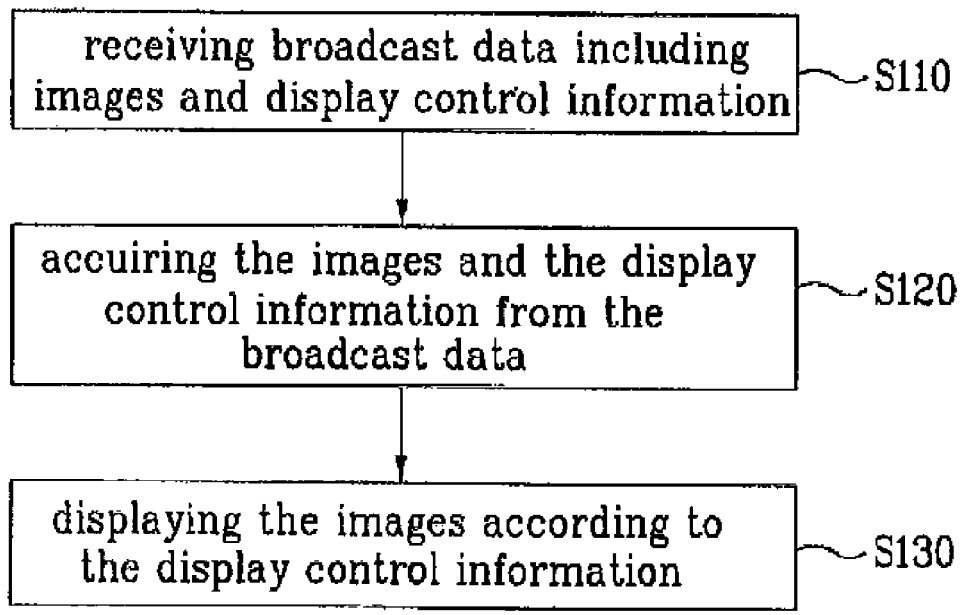
FIG. 3 is a flowchart illustrating a method for receiving and displaying a broadcast signal according to an embodiment of the present invention.

Next, FIG. 3 is a flowchart illustrating method of receiving a broadcast signal according to an embodiment of the present invention. As discussed above, the broadcast signal includes broadcast objects (which are also hereinafter referred to as broadcast images) and the display control information. As shown in FIG. 3, the broadcast signal including the broadcast images and display control information are first received (S110), and extracted from the broadcast signal (S120). Then, the broadcast images are displayed in accordance with the display control information (S130). As discussed above, the display order, the display interval and the dimension information of the broadcast images is defined in the display control information.

Turning next to FIGS. 4 to 8, which are timelines representing examples of transmitting and receiving broadcast images according to different embodiments of the present invention. In addition, in these examples, it is assumed the transmission intervals of the images are one second.

Figure 4:
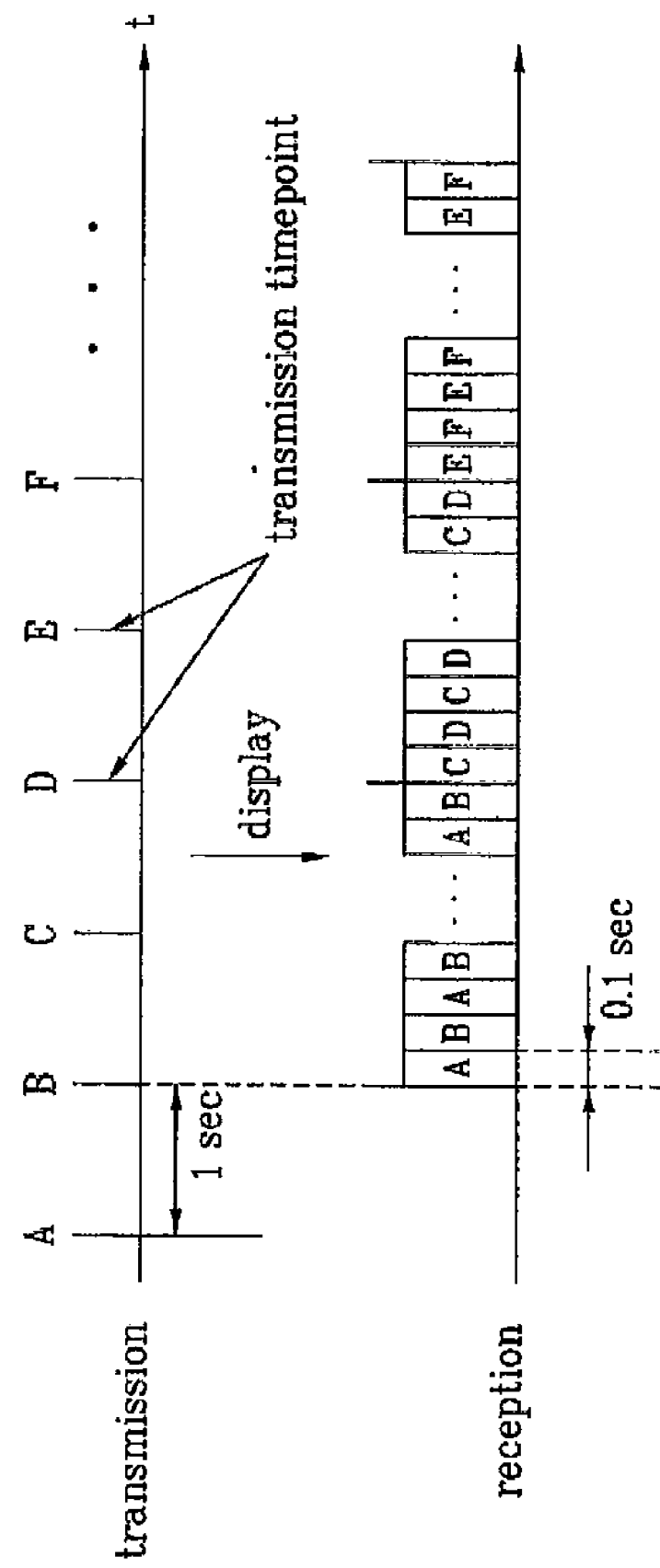
FIG. 4 is a timing diagram illustrating broadcast objects being transmitted at a first time interval and displayed at a second time interval shorter than the first time interval.

As shown in FIG. 4, the broadcast signal transmitter transmits the images A, B, C, D, E and F at an interval of 1 second. Further, the transmitted images are displayed at a delayed time point from when the images are transmitted. In more detail, and as shown in the example of FIG. 4, the received images are first stored and then displayed at intervals shorter than they were transmitted. For example, in FIG. 4, the images are stored and then displayed in intervals of 0.1 seconds.

In addition, the images A and B are repeatedly displayed at an interval of 0.1 second from the time point at which the image B is first received, and the images C and D are repeatedly displayed from the time point at which the image D is first received. A similar concept applies to the images E and F, etc. Accordingly, a user of the receiver can view the images as dynamic images similar to a slide show by displaying the received images quickly and repeatedly.

Figure 5:
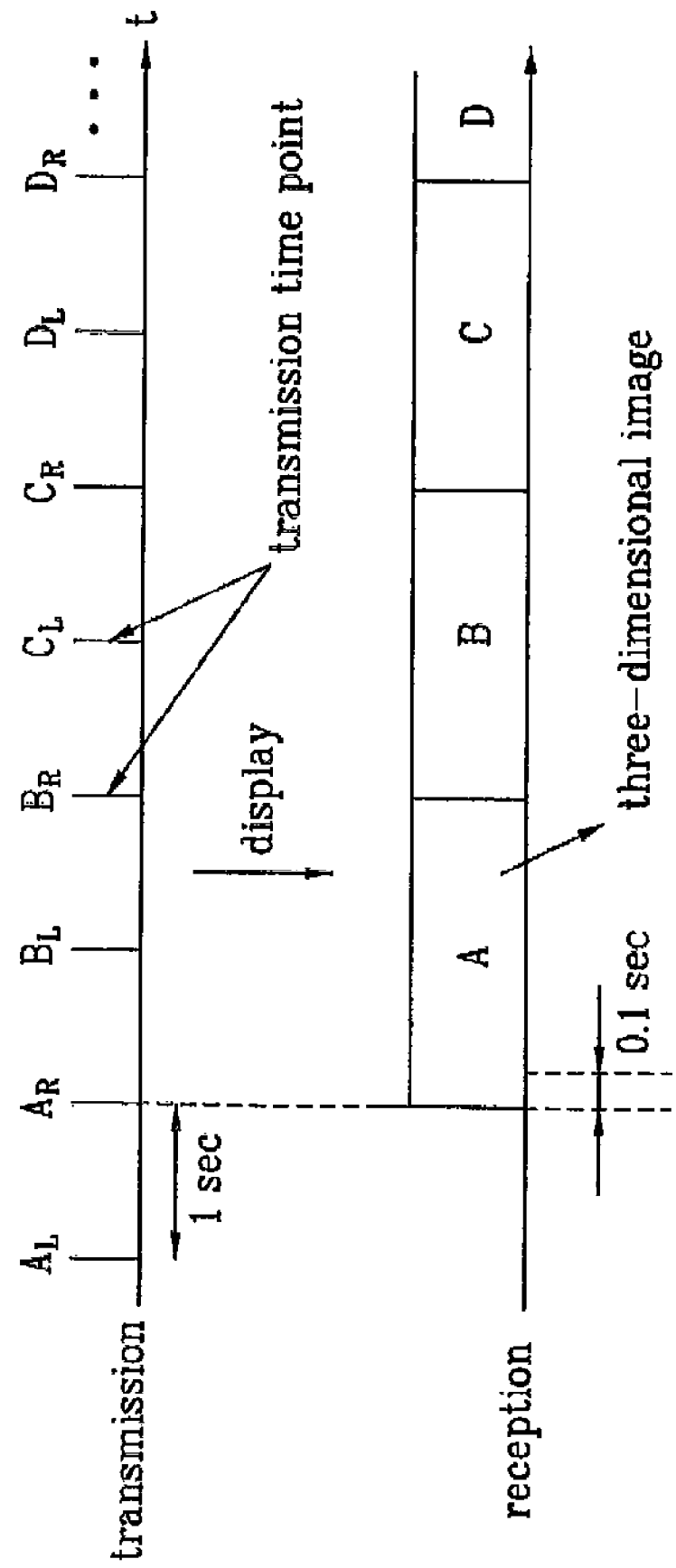
FIG. 5 is a timing diagram illustrating broadcast objects being transmitted and displayed as a three-dimensional image.

Next, another example is illustrated in FIG. 5. In this example, received two-dimensional images are displayed as a three-dimensional image. That is, the three-dimensional image is an image generated by composing two images for a person's left and right eye, respectively. Then, when the two images are displayed to the person, the person views the image as a three-dimensional image based on a binocular disparity phenomenon.

In more detail, and with reference to FIG. 5, a broadcast signal transmitter generates two image files, one of which is reflected by the person's left eye (subscripted by the letter "L") and the other of which is reflected by person's right eye (subscripted by the letter "R"). Further, as shown in FIG. 5, the two image files are sequentially transmitted in order to a broadcast receiver, which displays a three-dimensional image using the transmitted two image files.

For example, FIG. 5 illustrates transmitting in succession images $A_R$ and $A_L$ for image A, images $B_R$ and $B_L$ for image B, images $C_R$ and $C_L$ for image C, and images $D_R$ and $D_L$ for image D. Note that in FIG. 5, the images for the person's left eye are transmitted before the images for the person's right eye. However, the images for the persons' right eye may be transmitted first.

In addition, as shown in FIG. 5, the present invention displays a three-dimensional image A when both of the $A_R$ and $A_L$ images are received, and displays a three-dimensional B image when both of the $B_R$ and $B_L$ images are received. Thus, a person viewing the displayed images feels as if they are watching a three-dimensional image. Also, FIG. 15 (which will be described in more detail later) illustrates in detail the method of composing two images into a three-dimensional image.

Figure 6:
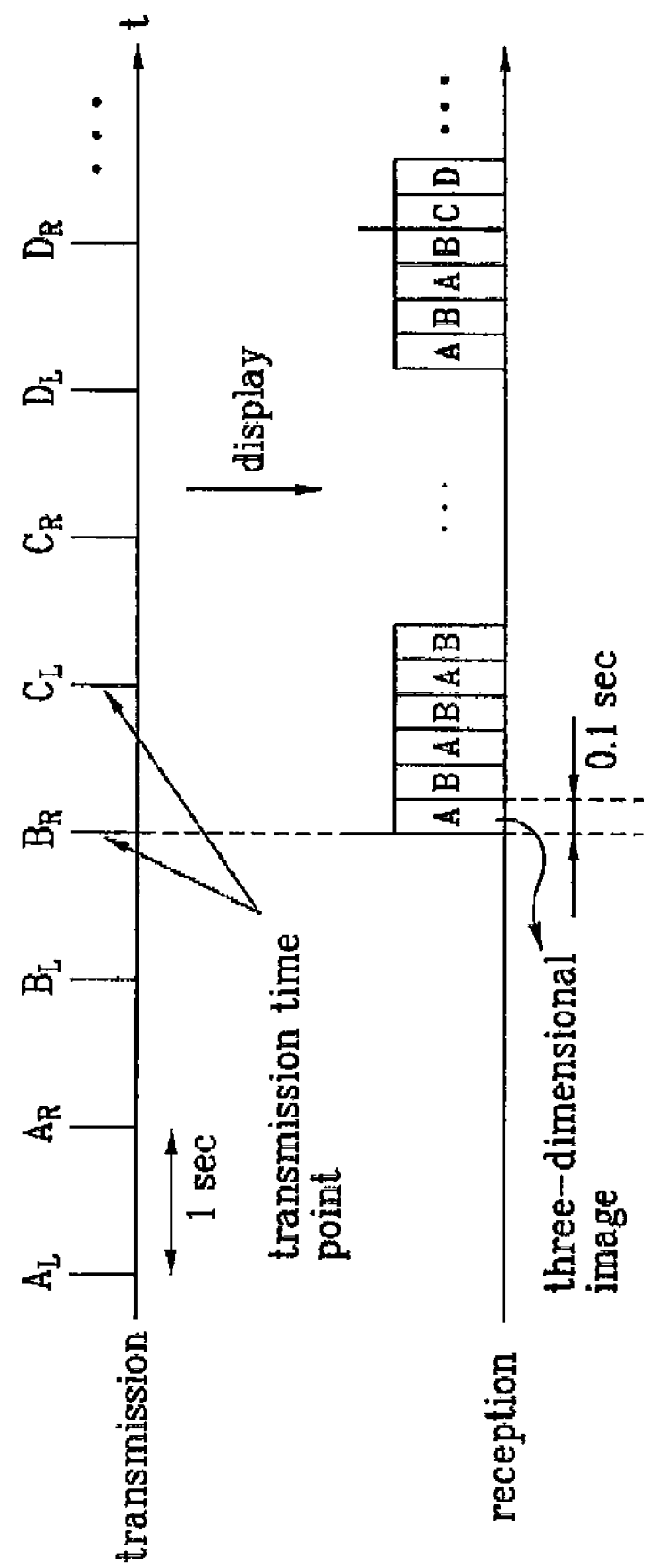
FIG. 6 is a timing diagram illustrating broadcast objects being transmitted and displayed as a moving three-dimensional image.

Next, FIG. 6 illustrates yet another example of transmitting and receiving images according to an embodiment of the present invention. In the example in FIG. 6, the images are transmitted in a similar manner as in FIG. 5, but are displayed differently. In more detail, the left and right eye A and B images are displayed quickly and repeatedly (e.g., at an interval of 0.1 seconds), when both of the left and right eye A and B images are received. Therefore, when the user views the display, he or she feels as if they are watching moving three-dimensional images.

Turning to another example of transmitting and receiving broadcast images according to an embodiment of the present invention. In this example, images are divided into groups and a first group of images are displayed after receiving a first and second group of images. In more detail, in the example in FIG. 7, the first group of images includes images A, B, C and D, and the second group of images includes images E, F, G, H and I. Further, the images in one image group may be related to each other, and the respective images displayed by these image groups may be discriminated.

Figure 7:
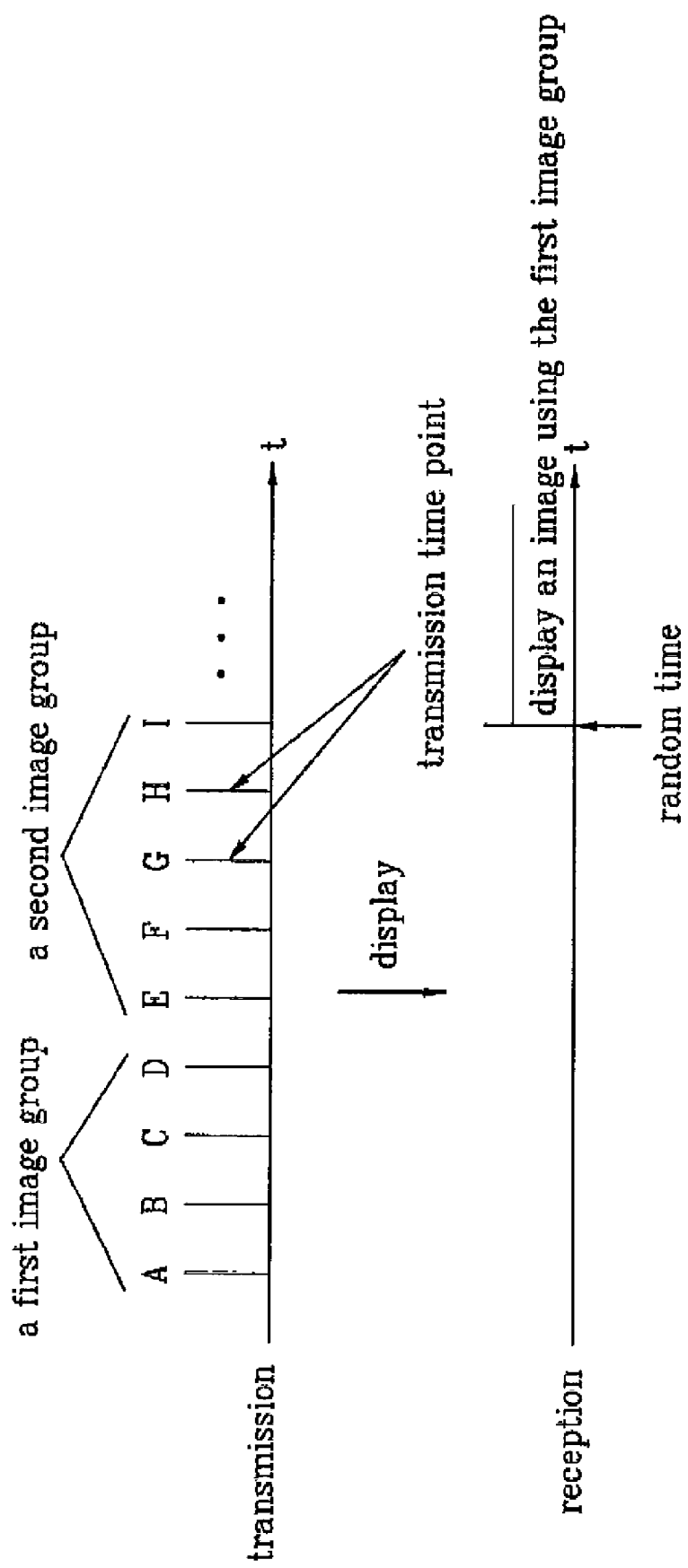
FIG. 7 is a timing diagram illustrating broadcast groups of broadcast objects being transmitted and received.

In addition, each image in the groups may correspond to a two-dimensional image or a three-dimensional image. For example, the first group of images may be two-dimensional images and the second group may be three-dimensional images. Also, the images may be displayed as moving images similar to a slide show. Therefore, when the images in one image group are displayed, it is preferable that the images are related to each other so the final image is smoothly displayed. Further, as shown in FIG. 7, at least one image in the first group is displayed when a last image of the second group is received. For example, the images A, B, C and D are displayed after received the last image I in the second group. Alternatively, the images in the first group may be displayed in a random order after receiving the last image from the second group. In addition, the images displayed in a group may be displayed at any random time after an image or images are received from a second group, for example.

Figure 8:
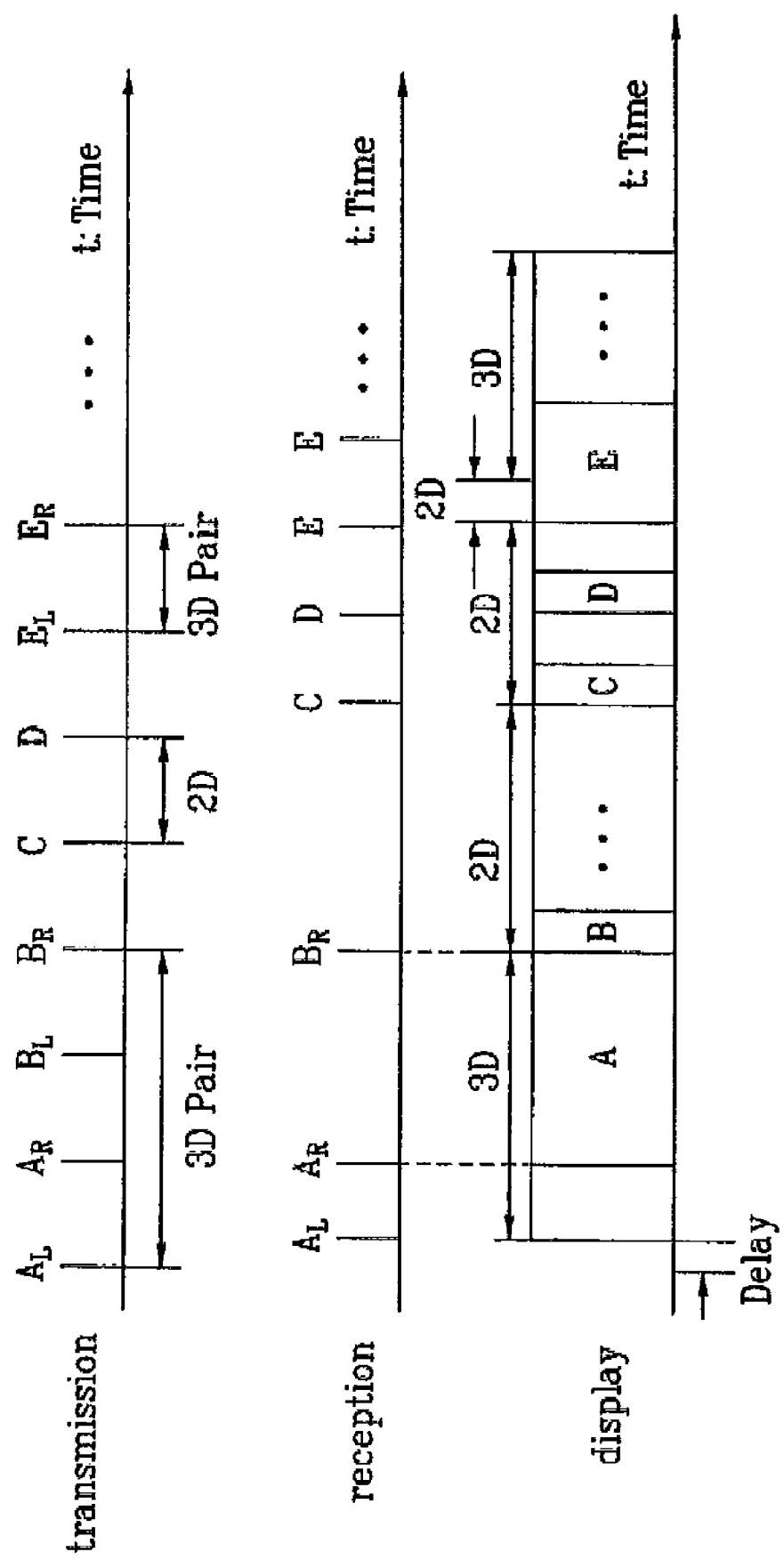
FIG. 8 is a timing diagram illustrating broadcast objects being variably displayed as two-dimensional or three-dimensional images.

Turning now to yet still another example of a method for transmitting and receiving a broadcast signal according to the present invention with reference to FIG. 8. In this example, two-dimensional and three-dimensional images are transmitted together. In more detail, and as shown in FIG. 8, the left eye image ($A_L$) and the right eye image ($A_R$) of image A, the left eye image ($B_L$) and the right eye image ($B_R$) of the image B, the image C, the image D, the left eye image ($E_L$) and the right eye image ($E_R$) of the image E are transmitted sequentially. Further, in this example, it is assumed the left eye image ($B_L$) of the image B is lost in transmission.

In addition, the three-dimensional image A may not be displayed until the right eye image $A_R$ is received. Alternatively, it is possible to first display only the image $A_L$ and after the image $A_R$ is received, or to display a three-dimensional image using both the $A_L$ and $A_R$ images. Further, because the image $B_L$ is not received (i.e., it was lost in transmission), the two-dimensional image B using the image $B_R$ only is displayed. Further, the two-dimensional images C and D are displayed sequentially.

In addition, the images C and D may also be displayed as the same order as they are received. Alternatively, the images C and D may be displayed repeatedly as a slide show immediately after receiving the image D, and not when first receiving the image C. In addition, the image E may be displayed as a two-dimensional image when the right eye image $E_R$ is received or may be displayed as a three-dimensional image E after both the right eye image $E_R$ and the left eye image $E_L$ are received Therefore, the above-described embodiments of the method for transmitting and receiving a broadcast signal can display more dynamic and more realistic images by configuring the transmitted images. That is, the order of the displayed images is changed from which they were transmitted thereby displaying more dynamic and realistic images.

Turning next to FIG. 9, which is an overview of a data structure for transmitting and receiving a broadcast signal according to an embodiment of the present invention. As discussed above, the images are displayed in an order that is different than an order the images were transmitted. That is, the broadcast images are configured to be displayed differently than they are transmitted. Thus, in accordance with an embodiment of the present invention, display control information indicating how the broadcast images are to be displayed or controlled is included in data structure to be transmitted either separately or together with the broadcast images.

Therefore, the broadcast transmitter does not need to transmit a broadcast signal including all the images to be displayed at one moment, but can transmit control information to control how a broadcast receiver displays the transmitted images. Further, the receiver can display images differently than they were transmitted to produce a slide show effect or to produce three-dimensional images, etc.

As shown in FIG. 9, the data structure includes a first field which carries header information related to the data structure of the broadcast images, a second field which carries the additional information related to displaying the broadcast images, and a third field which carries the raw data of the broadcast images. The first field is generally called a header field, and the third field is generally called the data field or body field. However, these fields are not limited by those terms. The second field will hereinafter be referred to as the additional information field.

The additional information field includes information related to the display order of the objects. Further, the display control information may be included in any one of these fields, but is preferably included in the additional information field.

Figure 10:
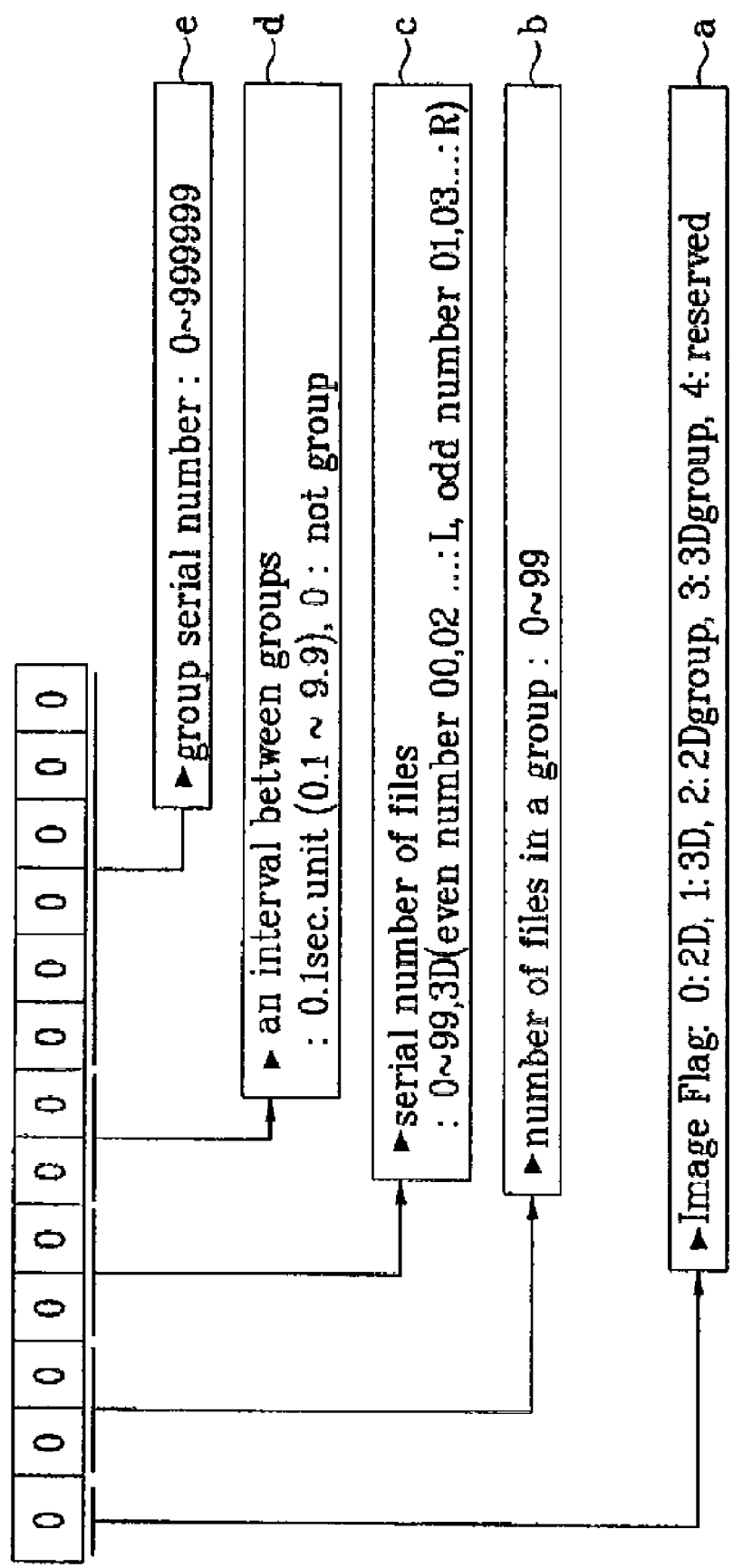
FIG. 10 is an overview of an additional information field in the data structure of FIG. 9.

Next, FIG. 10 is an overview of the additional information field in the data structure shown in FIG. 9. In this example, the display control information is included in the additional information field. The display control information may include any one of dimension information and display order information of the broadcast objects in the data.

As shown in FIG. 10, the display control information includes an image display field (a) including image dimensions (e.g., two or three dimensions) and display order information. In more detail, a value of the image display field being 0 (zero) indicates the images in the data can be displayed as a two-dimensional image (e.g., a still image), a value of the image display field being 1 (one) indicates the images in the data can be displayed as a three-dimensional image, a value of 2 (two) indicates the images in the data are in a two-dimensional image group, a value of 3 (three) indicates the images are in a three-dimensional image groups, and a value of 4 (four) is reserved.

Further, the images in a two-dimensional image group can be displayed as sequential sliding two-dimensional images, and the images in a three-dimensional image group can be displayed as three-dimensional moving images. In addition, the value of the image display field being 0 (zero) may also be used to indicate that the images in the data are displayed in the order they are received. Accordingly, the system of the present invention is backward compatible with related art receivers.

Further, as shown in FIG. 10, the display control information also includes a field (b) indicating how many files are in the raw data or a number of images in an image group, and serial number field (c) indicating serial numbers of the images, an interval field (d) indicating a displaying time interval, and a serial number field (a) indicating a number of data structures. Further, the information representing the number of images in the image group means the total number of images included in the image group. For example, the number of images in a group may be 2, 3, etc.

As shown in the example of FIG. 10, the information indicating the serial numbers of the images in an image group is from 0 to 99. Also, if a displayed image is a three-dimensional image, the information indicating the serial numbers of the images in the image group can be an even-number as for a left eye image and an odd-number for the right eye images (as shown in FIG. 10).

Further, the information indicating the displaying interval of the images displayed by the respective image groups means an interval between an image displayed by an image group and another image displayed by another image group. For example, FIG. 10 illustrates a displaying interval of respective image groups is 0.1 second. Also, a value of 0 (zero) for this information means that the image is not included in a group.

In addition, the data structure illustrated in FIG. 10 can be transmitted or received on any broadcasting or communication system. Further, a broadcasting system or communication system transmits and receives an object according to a variety of different protocols. Thus, the fields illustrated in FIG. 10 can be set in a reserved field or user private field in the protocol of the broadcasting system or the communication system.

In the following description, it is assumed the protocol used by the broadcasting system is the Multimedia Object Transfer (MOT) protocol. In more detail, FIGS. 11A and 11B illustrates a part of the MOT protocol used in a broadcasting system. FIG. 11B illustrates a part of data fields in the MOT protocol, which are used in the multimedia digital audio broadcasting (DAB) system in accordance with the EN 301 234 version 2.1.1 standard.

Further, the data structure illustrated in FIG. 10 is defined in a reserved field in the MOT protocol ("reserved for MOT protocol extensions" in FIG. 11B). Also the display control information may be established in a designated region in the MOT protocol, if the designated region is not used. In addition, the display control information can be established in a variable length of the reserved fields according to the NOT protocol. The variable length of data field is more preferable than the fixed length of data field, because the variable length of data field can be extended.

Further, in FIG. 11B, the display control information illustrated in FIG. 10 can be included in the ContentName field according to the MOT protocol. Also, in FIG. 11A, the Arabic numerals field is used as the ContentName field (shown being hatched in FIG. 11A).

Figure 12:
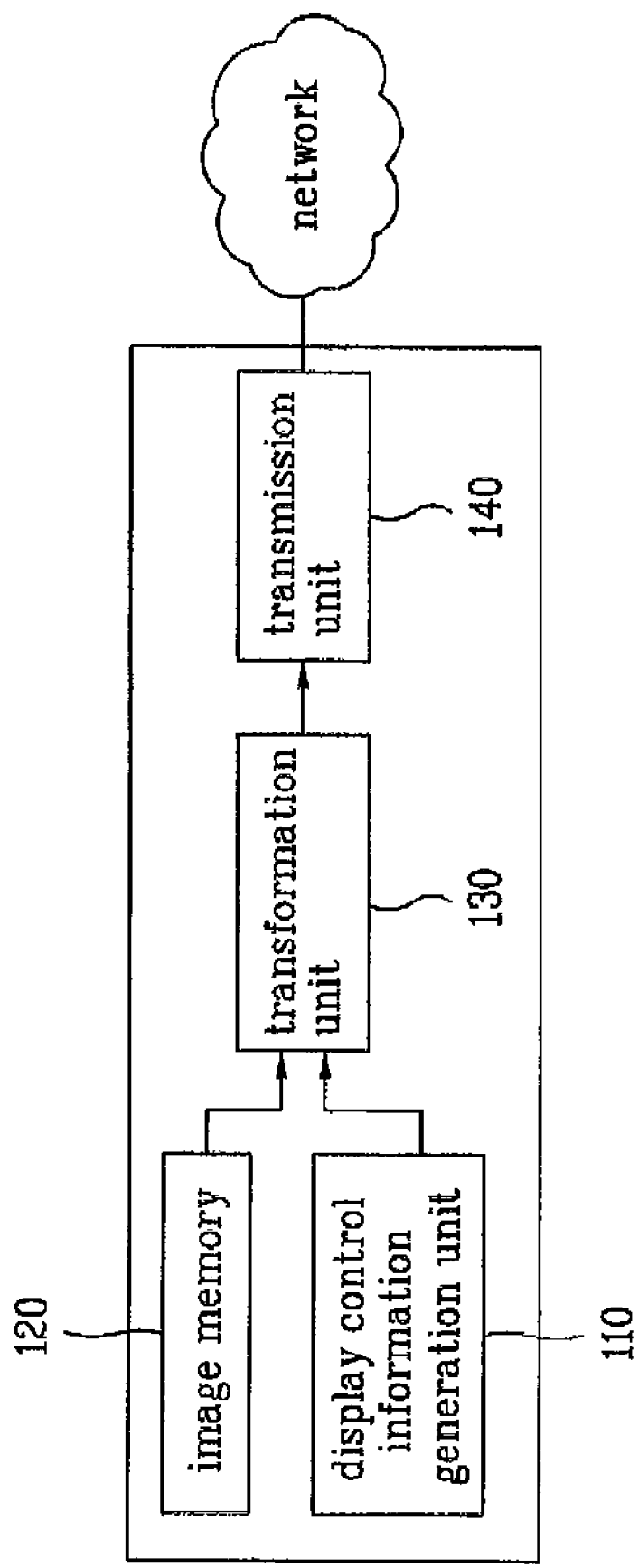
FIG. 12 is a block diagram illustrating an apparatus for transmitting a broadcast signal in accordance with an embodiment of the present invention.

Next, FIG. 12 is a block diagram illustrating an apparatus for transmitting a broadcast signal in accordance with an embodiment of the present invention. As shown, the apparatus includes a display control information generation unit 110, an image memory 120, a broadcasting data transformation unit 130 and transmission unit 140. The display control information generation unit 110 generates display control information indicating how images are to be displayed in a receiver. For example, the display control information includes a dimension and order of the displayed images. Further, as discussed above, the display control information is included in the data structure shown in FIG. 10.

In addition, the image memory 120 stores the images to be transmitted. Further, the images may be generated outside the transmitter and then stored in the memory 120 or may be generated by the transmitter itself. Further, the broadcasting data transform unit 130 transforms the images in the image memory 120 and the display control information from the display control information generation unit 110 into a format of broadcasting data. In addition, the broadcasting data is packetized according to a broadcast protocol.

Also, the transmission unit 140 transmits the broadcasting data throughout a wire or wireless network. Further, the transmitter controls a broadcast signal receiver to display the images of the transmitted images using the display control information. Accordingly, the broadcast signal transmitter does need to simultaneously transmit all the images displayed in the receiver.

Figure 13:
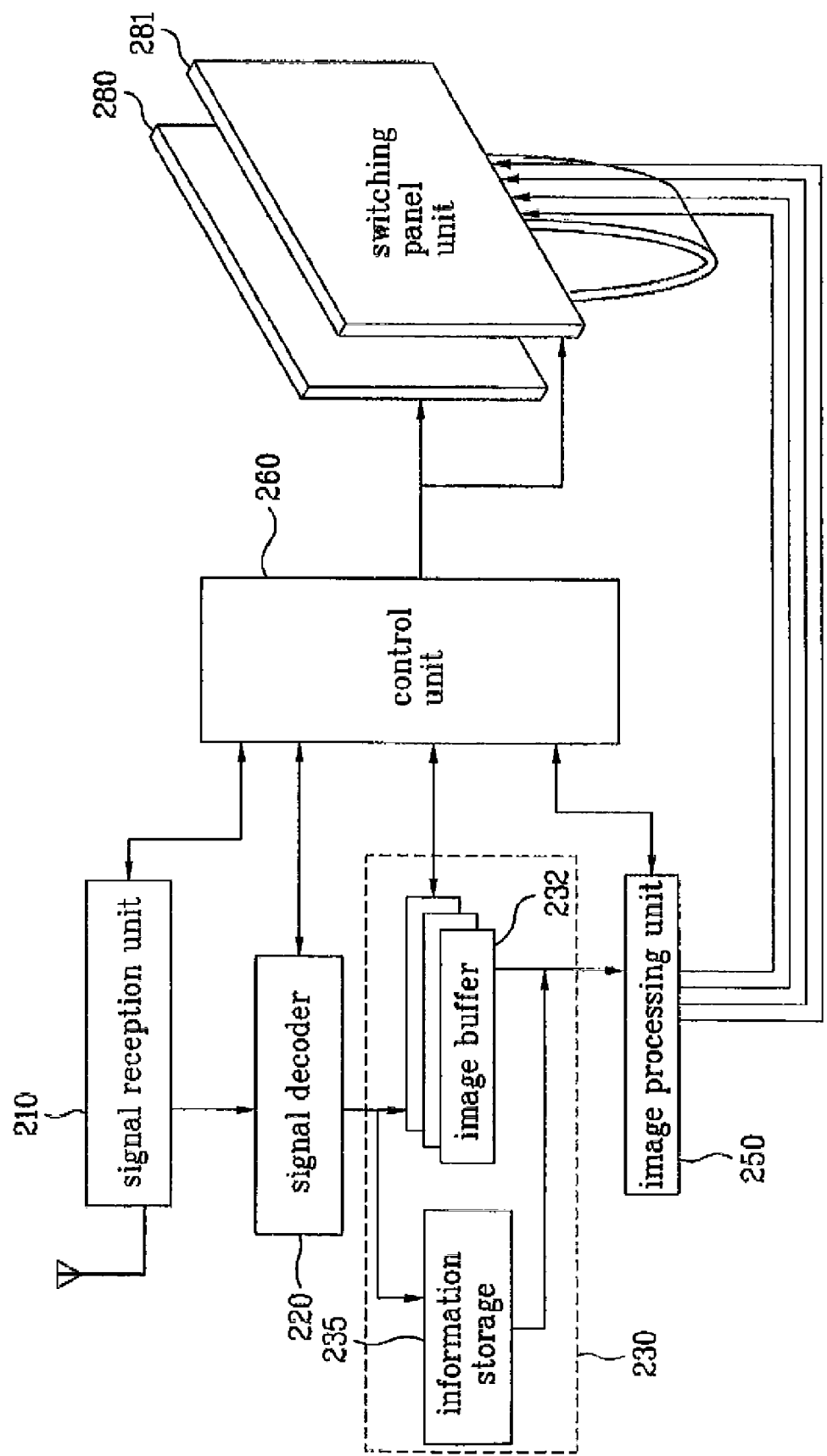
FIG. 13 is a block diagram illustrating an apparatus for receiving a broadcast signal in accordance with an embodiment of the present invention.

Next, FIG. 13 is a block diagram illustrating an apparatus for receiving a broadcast signal in accordance with an embodiment of the present invention. As shown, the apparatus include a signal reception unit 210, a signal decoder 220, a memory unit 230, an image processing unit 250, a control unit 260 and display unit 280. The apparatus also includes a switching panel 281 for displaying three-dimensional images.

In addition, the signal reception unit 210 receives and demodulates a broadcast signal, and the signal decoder 220 decodes the demodulated signal. That is, the decoder 220 divides and outputs broadcast objects and display control information. In addition, the memory unit 230 stores the broadcast objects and display control information outputted from the broadcasting decoder 220.

In addition, the memory unit 230 may include an image buffer 232 for storing images, and an information storage 235 for storing the display control information. The image buffer 232 includes many buffers for storing the images. Also, the image processing unit 250 processes the images stored in the memory unit 230 in accordance with the display control information, and the control unit 260 controls the different units in the FIG. 13.

Further, the image processing unit 250 and the control unit 260 may be combined into a single physical unit. Also, the display unit 280 displays the images processed from the image processing unit 250. Further, for displaying three-dimensional images, the switching panel unit 281 is used. That is, the switching panel unit 281 is switched off to display a two-dimensional image and switched on to display a three-dimensional image.

Figure 14:
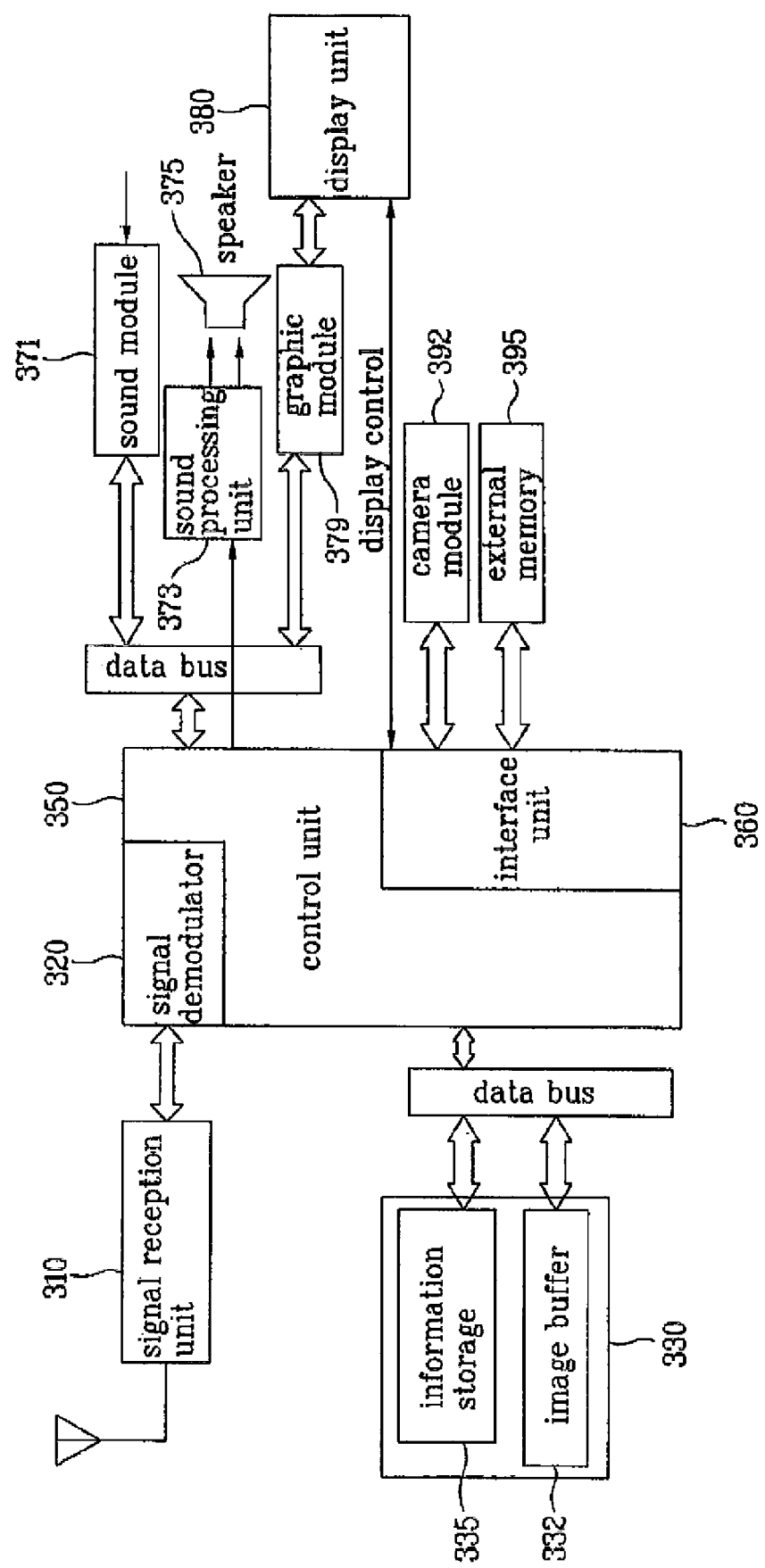
FIG. 14 is a block diagram illustrating another apparatus for receiving a broadcast signal in accordance with an embodiment of the present invention.

FIG. 14 is a block diagram illustrating an apparatus for receiving a broadcast signal in accordance with another embodiment of the present invention. As shown, the apparatus includes a signal reception unit 310, a signal demodulator 320, a memory unit 330, a control unit 350 and a display unit 380. The signal reception unit 310 receives a signal including a broadcast object and display control information, and the signal demodulator 320 demodulates the signals received from the signal reception unit 310.

Further, the control unit 350 obtains images as broadcast objects and display control information of the images, and stores the images and the display control information in the memory unit 330. The memory unit 330 includes at least one image buffer 332 for storing the images and information storage 335 for storing the display control information, respectively. The control unit 350 decodes the images, and controls the display unit 380 to display the images in accordance with the display control information.

Thus, when a user watches the displayed images, the display images look like a still three-dimensional image, moving three-dimensional images and sliding images based on the display control information. Similar to the embodiment shown in FIG. 13, the display unit 380 includes a switching panel for displaying a three-dimensional image. The apparatus in FIG. 14 also includes a sound module 371, a sound processing unit 373, a speaker 375, a graphic module 379, a camera module 392 and an external memory 395 connected to an interface unit 360.

Figure 15:
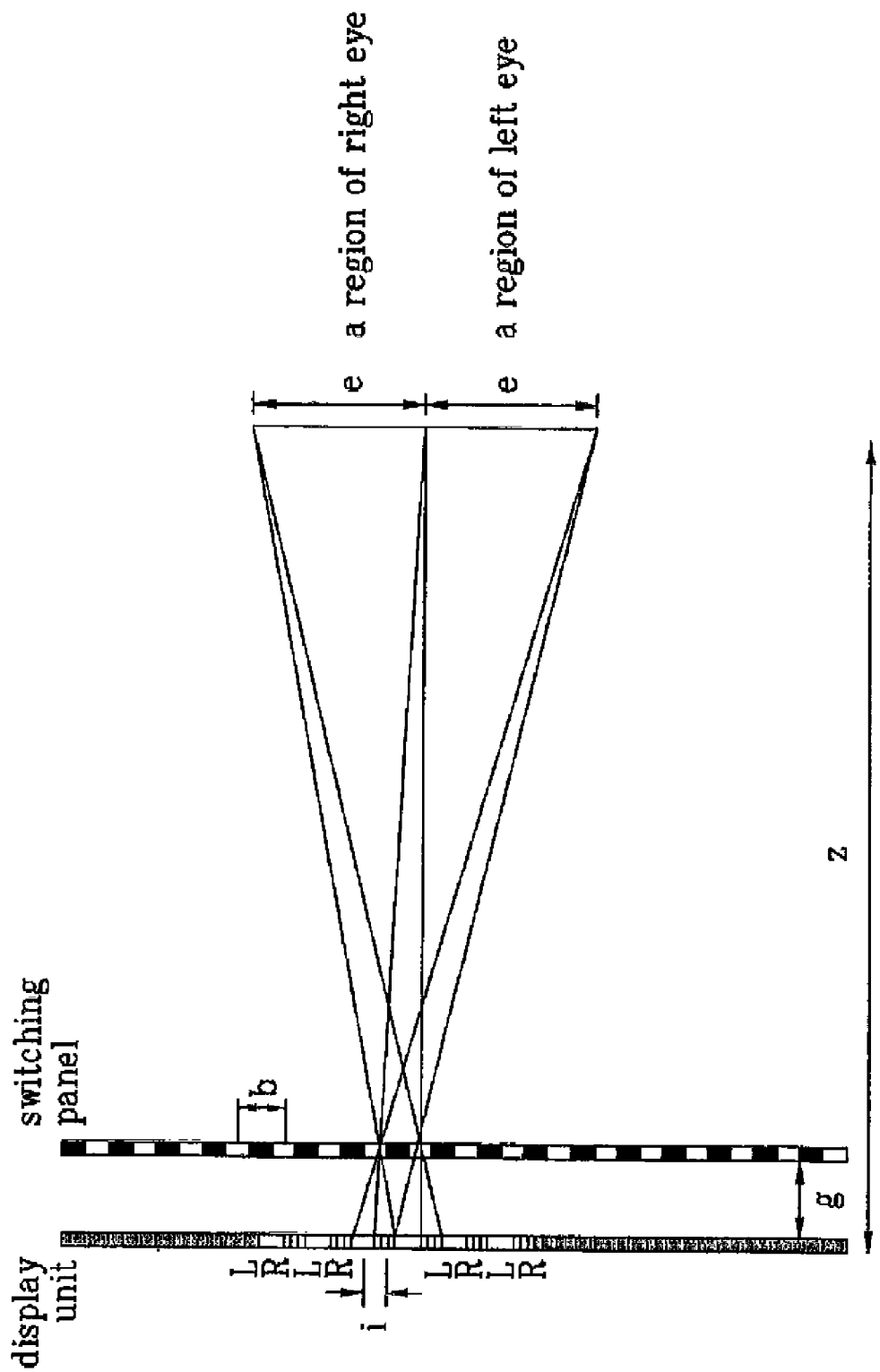
FIG. 15 is an overview illustrating a principle of displaying a three-dimensional image through a switching panel according to an embodiment of the present invention.

Next, FIG. 15 is an overview illustrating a concept of displaying a three-dimensional image using a switching panel. The displayed image (include images for a user' right eye and left eye) are viewed by the user as a three-dimensional image due to the binocular disparity phenomenon. In more detail, the binocular disparity phenomenon occurs because of a difference between a focus of light rays incident on the users' left and right eyes. That is, if a difference between a first image (R) seen from the right eye of the user and a second image (L) seen from the left eye of the user generated, the user's brain composes the left and right images into a three-dimensional image.

Therefore, an image for the right eye and another image for the left eye are prepared and displayed to the user. Therefore, when the user watches the composed image, the user sees the image as a three-dimensional image. Further, the two images may be composed using an interpolation method, etc.

Thus, with reference to FIG. 15, b denotes the distance between adjacent barriers in a switching panel, g denotes the distance between the switching panel and the display unit, and z denotes the distance between the focus of the user's eyes and the display unit. Thus, when two images are composed by the pixel, the switching panel is activated so that eyesight from the right eye corresponds to pixels in the right eye image, and the other eyesight from the left eye corresponds to pixels in the left eye image.

Further, the switching panel turns on to divide the incident eyesight on the switching panel. Accordingly, the broadcast signal receiver displays a three-dimensional image. Alternatively, the switching panel turns off and a user's binocular disparity is not generated, so that the switching panel passes the incident eyesight on the switching panel. Accordingly, the broadcast signal receiver can display a two-dimensional image.

The above embodiments refers to images as an example of objects including text, still images, moving images, audio contents, etc. However, any image object may be controlled based on the display control information according to the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting a broadcast signal, the method comprising:
    generating display control information for a plurality of broadcast objects to be displayed on a receiving terminal; and
    transmitting the broadcasting signal including both the plurality of broadcast objects and the display control information to the receiving terminal,
    wherein the display control information includes instructions on how the receiving terminal is to display the plurality of images,
    wherein the instructions included in the display control information instruct the receiving terminal to repeatedly display a received first and a second broadcast object at a predetermined time interval after both of the first and second broadcast objects have been received and until both a third broadcast object and a fourth broadcast object are received, and
    wherein the predetermined time interval is shorter than a time interval in which the first and second broadcast objects were successively transmitted.

2. The method of claim 1, wherein the instructions included in the display control information indicate a display order of how the broadcast objects are to be displayed on the receiving terminal.

3. The method of claim 1, wherein the instructions included in the display control information instruct the receiving terminal to repeatedly display the third and fourth broadcast objects at the predetermined time interval only after both of the third and fourth broadcast objects have been received.

4. A method for transmitting a broadcast signal, the method comprising:
    generating display control information for a plurality of broadcast objects to be displayed on a receiving terminal; and
    transmitting the broadcasting signal including both the plurality of broadcast objects and the display control information to the receiving terminal,
    wherein the display control information includes instructions on how the receiving terminal is to display the plurality of images,
    wherein the transmitted broadcast objects correspond to two-dimensional images including left and right eye images for a user's left eye and a user's right eye, respectively,
    wherein the instructions included in the display control information instruct the receiving terminal to sequentially display the left and right eye images at a predetermined interval after receiving both of the left and right eye images to produce a three-dimensional image, and
    wherein the predetermined time interval is shorter than a time interval in which the left and right eye images were successively transmitted.

5. A method for transmitting a broadcast signal, the method comprising:
    generating display control information for a plurality of broadcast objects to be displayed on a receiving terminal; and
    transmitting the broadcasting signal including both the plurality of broadcast objects and the display control information to the receiving terminal,
    wherein the display control information includes instructions on how the receiving terminal is to display the plurality of images,
    wherein the transmitted broadcast objects correspond to at least first left and right eye two-dimensional images for a user's left eye and a user's right eye, respectively, and second left and right eye two-dimensional images for the user's left eye and the user's right eye, respectively,
    wherein the instructions included in the display control information instruct the receiving terminal to repeatedly display the first and second left and right eye two-dimensional images at a predetermined time interval after both of the first and second left and right eye two-dimensional images have been received and until third and fourth left and right eye two-dimensional images are received, and
    wherein the predetermined time interval is shorter than a time interval in which the first and second left and right eye images were successively transmitted.

6. A method for transmitting a broadcast signal, the method comprising:

generating display control information for a plurality of broadcast objects to be displayed on a receiving terminal; and transmitting the broadcasting signal including both the plurality of broadcast objects and the display control information to the receiving terminal, wherein the display control information includes instructions on how the receiving terminal is to display the plurality of images, wherein the transmitted broadcast objects correspond to a plurality of images in a first group and a plurality of images in a second group, wherein the instructions included in the display control information instruct the receiving terminal to display the images in the first group at a predetermined time interval after the images in both of the first and second groups are received, and wherein the predetermined time interval is shorter than a time interval in which the images in the first and second groups were successively transmitted.

7. A method for transmitting a broadcast signal, the method comprising:

generating display control information for a plurality of broadcast objects to be displayed on a receiving terminal; and transmitting the broadcasting signal including both the plurality of broadcast objects and the display control information to the receiving terminal, wherein the display control information includes instructions on how the receiving terminal is to display the plurality of images, wherein the transmitted broadcast objects correspond to a plurality of two-dimensional and three-dimensional images, and wherein the instructions included in the display control information instruct the receiving terminal to display a corresponding three-dimensional image as a two-dimensional image when a portion of the corresponding three-dimensional image is not received by the receiving terminal.

8. The method of claim 1, wherein the display control information includes at least one of:

information indicating whether the broadcast objects include a two-dimensional or a three-dimensional image;

information indicating whether the broadcast objects correspond to a group of two-dimensional images or three-dimensional images;

information indicating a number of the broadcast objects;

information indicating a serial number for each broadcast object; and information indicating a time interval between successively displayed broadcast objects.

9. A method for receiving a broadcast signal, the method comprising:

receiving the broadcasting signal;

extracting a plurality of broadcast objects and display control information from the received broadcast signal; and displaying the broadcast objects according to the display control information on a receiving terminal, wherein the display control information includes instructions on how the receiving terminal is to display the plurality of images on the receiving terminal, wherein the instructions included in the display control information instruct the receiving terminal to repeatedly display a received first and a second broadcast object at a predetermined time interval after both of the first and second broadcast objects have been received and until both a third broadcast object and a fourth broadcast object are received, and wherein the predetermined time interval is shorter than a time interval in which the first and second broadcast objects were successively received.

10. The method of claim 9, wherein the instructions included in the display control information indicate a display order of how the broadcast objects are to be displayed on the receiving terminal.

11. The method of claim 9, wherein the instructions included in the display control information instruct the receiving terminal to repeatedly display the third and fourth broadcast objects at the predetermined time interval only after both of the third and fourth broadcast objects have been received.

12. A method for receiving a broadcast signal, the method comprising:

receiving the broadcasting signal;

extracting a plurality of broadcast objects and display control information from the received broadcast signal; and displaying the broadcast objects according to the display control information on a receiving terminal, wherein the display control information includes instructions on how the receiving terminal is to display the plurality of images on the receiving terminal, wherein the received broadcast objects correspond to two-dimensional images including left and right eye images for a user's left eye and a user's right eye, respectively, wherein the instructions included in the display control information instruct the receiving terminal to sequentially display the left and right eye images at a predetermined interval after receiving both of the left and right eye images to produce a three-dimensional image, and wherein the predetermined time interval is shorter than a time interval in which the left and right eye images were successively received.

13. A method for receiving a broadcast signal, the method comprising:

receiving the broadcasting signal;

extracting a plurality of broadcast objects and display control information from the received broadcast signal; and displaying the broadcast objects according to the display control information on a receiving terminal, wherein the display control information includes instructions on how the receiving terminal is to display the plurality of images on the receiving terminal, wherein the received broadcast objects correspond to at least first left and right eye two-dimensional images for a user's left eye and a user's right eye, respectively, and second left and right eye two-dimensional images for the user's left eye and the user's right eye, respectively, wherein the instructions included in the display control information instruct the receiving terminal to repeatedly display the first and second left and right eye two-dimensional images at a predetermined time interval after both of first and second left and right eye two-dimensional images have been received and until third and fourth left and right eye two-dimensional images are received, and wherein the predetermined time interval is shorter than a time interval in which the first and second left and right eye images were successively received.

14. A method for receiving a broadcast signal, the method comprising:

receiving the broadcasting signal;

extracting a plurality of broadcast objects and display control information from the received broadcast signal; and displaying the broadcast objects according to the display control information on a receiving terminal, wherein the display control information includes instructions on how the receiving terminal is to display the plurality of images on the receiving terminal, wherein the received broadcast objects correspond to a plurality of images in a first group and a plurality of images in a second group, wherein the instructions included in the display control information instruct the receiving terminal to display the images in the first group at a predetermined time interval after the images in both of the first and second groups are received, and wherein the predetermined time interval is shorter than a time interval in which the images in the first and second groups were successively received.

15. A method for receiving a broadcast signal, the method comprising:

receiving the broadcasting signal;

extracting a plurality of broadcast objects and display control information from the received broadcast signal; and displaying the broadcast objects according to the display control information on a receiving terminal, wherein the display control information includes instructions on how the receiving terminal is to display the plurality of images on the receiving terminal, wherein the received broadcast objects correspond to a plurality of two-dimensional and three-dimensional images, and wherein the instructions included in the display control information instruct the receiving terminal to display a corresponding three-dimensional image as a two-dimensional image when a portion of the corresponding three-dimensional image is not received by the receiving terminal.

16. The method of claim 9, wherein the display control information includes at least one of:

information indicating whether the broadcast objects include a two-dimensional or a three-dimensional image;

information indicating whether the broadcast objects correspond to a group of two-dimensional images or three-dimensional images;

information indicating a number of the broadcast objects;

information indicating a serial number for each broadcast object; and information indicating a time interval between successively displayed broadcast objects.

17. An apparatus for transmitting a broadcast signal, the apparatus comprising:

a generation unit configured to generate display control information for a plurality of broadcast objects to be displayed on a receiving terminal;

a transformation unit configured to form the display control information and the plurality of broadcast objects into a format of the broadcast signal; and a transmitting unit configured to transmit the broadcasting signal including both the plurality of broadcast objects and the display control information to the receiving terminal, wherein the display control information includes instructions on how the receiving terminal is to display the plurality of images, wherein the instructions included in the display control information instruct the receiving terminal to repeatedly display a received first and a second broadcast object at a predetermined time interval after both of the first and second broadcast objects have been received and until both a third broadcast object and a fourth broadcast object are received, and wherein the predetermined time interval is shorter than a time interval in which the first and second broadcast objects were successively transmitted.

18. The apparatus of claim 17, wherein the instructions included in the display control information indicate a display order of how the broadcast objects are to be displayed on the receiving terminal.

19. The apparatus of claim 17, wherein the instructions included in the display control information instruct the receiving terminal to repeatedly display the third and fourth broadcast objects at the predetermined time interval only after both of the third and fourth broadcast objects have been received.

20. An apparatus for transmitting a broadcast signal, the apparatus comprising:

a generation unit configured to generate display control information for a plurality of broadcast objects to be displayed on a receiving terminal;

a transformation unit configured to form the display control information and the plurality of broadcast objects into a format of the broadcast signal; and a transmitting unit configured to transmit the broadcasting signal including both the plurality of broadcast objects and the display control information to the receiving terminal, wherein the display control information includes instructions on how the receiving terminal is to display the plurality of images, wherein the transmitted broadcast objects correspond to two-dimensional images including left and right eye images for a user's left eye and a user's right eye, respectively, wherein the instructions included in the display control information instruct the receiving terminal to sequentially display the left and right eye images at a predetermined interval after receiving both of the left and right eye images to produce a three-dimensional image, and wherein the predetermined time interval is shorter than a time interval in which the left and right eye images were successively transmitted.

21. An apparatus for transmitting a broadcast signal, the apparatus comprising:

a generation unit configured to generate display control information for a plurality of broadcast objects to be displayed on a receiving terminal;

a transformation unit configured to form the display control information and the plurality of broadcast objects into a format of the broadcast signal; and a transmitting unit configured to transmit the broadcasting signal including both the plurality of broadcast objects and the display control information to the receiving terminal, wherein the display control information includes instructions on how the receiving terminal is to display the plurality of images, wherein the transmitted broadcast objects correspond to at least first left and right eye two-dimensional images for a user's left eye and a user's right eye, respectively, and second left and right eye two-dimensional images for the user's left eye and the user's right eye, respectively, wherein the instructions included in the display control information instruct the receiving terminal to repeatedly display the first and second left and right eye two-dimensional images at a predetermined time interval after both of the first and second left and right eye two-dimensional images have been received and until third and fourth left and right eye two-dimensional images are received, and wherein the predetermined time interval is shorter than a time interval in which the first and second left and right eye images were successively transmitted.

22. An apparatus for transmitting a broadcast signal, the apparatus comprising:
- a generation unit configured to generate display control information for a plurality of broadcast objects to be displayed on a receiving terminal;
- a transformation unit configured to form the display control information and the plurality of broadcast objects into a format of the broadcast signal; and
- a transmitting unit configured to transmit the broadcasting signal including both the plurality of broadcast objects and the display control information to the receiving terminal,
- wherein the display control information includes instructions on how the receiving terminal is to display the plurality of images,
- wherein the transmitted broadcast objects correspond to a plurality of images in a first group and a plurality of images in a second group,
- wherein the instructions included in the display control information instruct the receiving terminal to display the images in the first group at a predetermined time interval after the images in both of the first and second groups are received, and
- wherein the predetermined time interval is shorter than a time interval in which the images in the first and second groups were successively transmitted.

23. An apparatus for transmitting a broadcast signal, the apparatus comprising:
- a generation unit configured to generate display control information for a plurality of broadcast objects to be displayed on a receiving terminal;
- a transformation unit configured to form the display control information and the plurality of broadcast objects into a format of the broadcast signal; and
- a transmitting unit configured to transmit the broadcasting signal including both the plurality of broadcast objects and the display control information to the receiving terminal,
- wherein the display control information includes instructions on how the receiving terminal is to display the plurality of images,
- wherein the transmitted broadcast objects correspond to a plurality of two-dimensional and three-dimensional images, and
- wherein the instructions included in the display control information instruct the receiving terminal to display a corresponding three-dimensional image as a two-dimensional image when a portion of the corresponding three-dimensional image is not received by the receiving terminal.

24. The apparatus of claim 17, wherein the display control information includes at least one of:
- information indicating whether the broadcast objects include a two-dimensional or a three-dimensional image;
- information indicating whether the broadcast objects correspond to a group of two-dimensional images or three-dimensional images;
- information indicating a number of the broadcast objects;
- information indicating a serial number for each broadcast object; and
- information indicating a time interval between successively displayed broadcast objects.

25. An apparatus for receiving a broadcast signal, the method comprising:
- a signal reception unit configured to receive the broadcasting signal;
- an extracting unit configured to extract a plurality of broadcast objects and display control information from the received broadcast signal; and
- a display configured to display the broadcast objects according to the display control information on a receiving terminal,
- wherein the display control information includes instructions on how the receiving terminal is to display the plurality of images on the receiving terminal,
- wherein the instructions included in the display control information instruct the receiving terminal to repeatedly display a received first and a second broadcast object at a predetermined time interval after both of the first and second broadcast objects have been received and until both a third broadcast object and a fourth broadcast object are received, and
- wherein the predetermined time interval is shorter than a time interval in which the first and second broadcast objects were successively received.

26. The apparatus of claim 25, wherein the instructions included in the display control information indicate a display order of how the broadcast objects are to be displayed on the display of the receiving terminal.

27. The apparatus of claim 25, wherein the instructions included in the display control information instruct the receiving terminal to repeatedly display the third and fourth broadcast objects at the predetermined time interval only after both of the third and fourth broadcast objects have been received.

28. An apparatus for receiving a broadcast signal, the method comprising:
- a signal reception unit configured to receive the broadcasting signal;
- an extracting unit configured to extract a plurality of broadcast objects and display control information from the received broadcast signal;
- a display configured to display the broadcast objects according to the display control information on a receiving terminal,
- wherein the display control information includes instructions on how the receiving terminal is to display the plurality of images on the receiving terminal; and
- a switching panel unit configured to switch between displaying two-dimensional and three-dimensional images on the display,
- wherein the received broadcast objects correspond to two-dimensional images including left and right eye images for a user's left eye and a user's right eye, respectively,
- wherein the instructions included in the display control information instruct the receiving terminal to turn on the switching panel unit and sequentially display the left and right eye images at a predetermined interval after receiving both of the left and right eye images to produce a three-dimensional image, and
- wherein the predetermined time interval is shorter than a time interval in which the left and right eye images were successively received.

29. An apparatus for receiving a broadcast signal, the method comprising:
- a signal reception unit configured to receive the broadcasting signal;

an extracting unit configured to extract a plurality of broadcast objects and display control information from the received broadcast signal;

a display configured to display the broadcast objects according to the display control information on a receiving terminal, wherein the display control information includes instructions on how the receiving terminal is to display the plurality of images on the receiving terminal; and a switching panel unit configured to switch between displaying two-dimensional and three-dimensional images on the display, wherein the received broadcast objects correspond to at least first left and right eye two-dimensional images for a user's left eye and a user's right eye, respectively, and second left and right eye two-dimensional images for the user's left eye and the user's right eye, respectively, wherein the instructions included in the display control information instruct the receiving terminal to turn on the switching panel unit and repeatedly display the first and second left and right eye two-dimensional images at a predetermined time interval after both of first and second left and right eye two-dimensional images have been received and until third and fourth left and right eye two-dimensional images are received, and wherein the predetermined time interval is shorter than a time interval in which the first and second left and right eye images were successively received.

30. An apparatus for receiving a broadcast signal, the method comprising;

a signal reception unit configured to receive the broadcasting signal;

an extracting unit configured to extract a plurality of broadcast objects and display control information from the received broadcast signal; and a display configured to display the broadcast objects according to the display control information on a receiving terminal, wherein the display control information includes instructions on how the receiving terminal is to display the plurality of images on the receiving terminal, wherein the received broadcast objects correspond to a plurality of images in a first group and a plurality of images in a second group, wherein the instructions included in the display control information instruct the receiving terminal to display the images in the first group at a predetermined time interval after the images in both of the first and second groups are received, and wherein the predetermined time interval is shorter than a time interval in which the images in the first and second groups were successively received.

31. An apparatus for receiving a broadcast signal, the method comprising:

a signal reception unit configured to receive the broadcasting signal;

an extracting unit configured to extract a plurality of broadcast objects and display control information from the received broadcast signal;

a display configured to display the broadcast objects according to the display control information on a receiving terminal, wherein the display control information includes instructions on how the receiving terminal is to display the plurality of images on the receiving terminal; and a switching panel unit configured to switch between displaying two-dimensional and three-dimensional images on the display, wherein the received broadcast objects correspond to a plurality of two-dimensional and three-dimensional images, and wherein the instructions included in the display control information instruct the receiving terminal to turn off the switching panel unit and display a corresponding three-dimensional image as a two-dimensional image when a portion of the corresponding three-dimensional image is not received by the receiving terminal.

32. The apparatus of claim 25, wherein the display control information includes at least one of:

information indicating whether the broadcast objects include a two-dimensional or a three-dimensional image;

information indicating whether the broadcast objects correspond to a group of two-dimensional images or three-dimensional images;

information indicating a number of the broadcast objects;

information indicating a serial number for each broadcast object; and information indicating a time interval between successively displayed broadcast objects.

* * * * *